(12) United States Patent
Kawano et al.

(10) Patent No.: US 12,134,577 B2
(45) Date of Patent: Nov. 5, 2024

(54) MANUFACTURING METHOD OF PLATE-SHAPED OBJECT

(71) Applicant: DISCO CORPORATION, Tokyo (JP)

(72) Inventors: Fumiya Kawano, Tokyo (JP); Noboru Takeda, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 454 days.

(21) Appl. No.: 17/404,005

(22) Filed: Aug. 17, 2021

(65) Prior Publication Data

US 2022/0064049 A1 Mar. 3, 2022

(30) Foreign Application Priority Data

Aug. 28, 2020 (JP) ................................. 2020-144283

(51) Int. Cl.
*C03B 33/02* (2006.01)
*B23K 26/38* (2014.01)

(52) U.S. Cl.
CPC .......... *C03B 33/0222* (2013.01); *B23K 26/38* (2013.01)

(58) Field of Classification Search
CPC ............................ B23K 26/38; C03B 33/0222
See application file for complete search history.

(56) References Cited

U.S. PATENT DOCUMENTS

2016/0311717 A1\* 10/2016 Nieber .................... C03B 23/02
2019/0217419 A1\* 7/2019 Kirihara ............. B23K 26/0853

FOREIGN PATENT DOCUMENTS

| DE | 102019200462 A1 | 7/2019 |
| JP | 2015226204 A | 12/2015 |
| JP | 2019206166 A | 12/2019 |

OTHER PUBLICATIONS

Office Action issued in counterpart German patent application No. 10 2021 209 057.5, dated Aug. 16, 2022.

\* cited by examiner

*Primary Examiner* — Mathieu D Vargot
(74) *Attorney, Agent, or Firm* — Greer Burns & Crain Ltd.

(57) ABSTRACT

A manufacturing method of a plate-shaped object includes a shield tunnel forming step of forming plural shield tunnels in a plate-shaped workpiece formed of a hard material and an etching step of etching the shield tunnels by an etchant. The plate-shaped object is capable of being bent by an external force. In the shield tunnel forming step, plural shield tunnels are formed in a first shield tunnel region having a first length along a line-shaped first processing-planned region set on one surface of the workpiece, and plural shield tunnels are formed in a second shield tunnel region having a second length along a line-shaped second processing-planned region that is different from a region on an extension line of the first processing-planned region and is adjacent to the first processing-planned region on the one surface.

3 Claims, 13 Drawing Sheets

MANUFACTURING METHOD OF PLATE-SHAPED OBJECT

BACKGROUND OF THE INVENTION

Field of the Invention

The present invention relates to a manufacturing method of a plate-shaped object in which the plate-shaped object that can be bent by an external force is manufactured by processing a plate-shaped workpiece formed of a hard material by a laser beam and a hard plate-shaped object that is formed of a hard material and can be bent by an external force.

Description of the Related Art

In recent years, portable terminals including a flexible display have been attracting attention (for example, refer to Japanese Patent Laid-open No. 2015-226204). The surface of such a flexible display is covered and protected by a transparent hard film or the like formed of resin (for example, refer to Japanese Patent Laid-open No. 2019-206166). However, the hard film made of resin involves a problem that the hard film is likely to get scratched and is likely to deteriorate over age. In order to solve this problem, for example, it is conceivable that the surface is protected by a plate-shaped object formed of a hard material such as glass.

SUMMARY OF THE INVENTION

However, when the plate-shaped object made of glass is made so thin as to be bendable, the strength of the plate-shaped object is insufficient. In contrast, when the plate-shaped object made of glass is made so thick as to be capable of ensuring the strength, it becomes difficult to bend the plate-shaped object. The present invention is made in view of such a problem and intends to balance the strength and the flexibility in a hard plate-shaped object.

In accordance with an aspect of the present invention, there is provided a manufacturing method of a plate-shaped object in which the plate-shaped object capable of being bent by an external force is manufactured by processing a plate-shaped workpiece formed of a hard material by a pulsed laser beam having such a wavelength as to be transmitted through the workpiece. The manufacturing method includes a shield tunnel forming step of forming, in the workpiece, a plurality of shield tunnels each including a pore formed along a thickness direction of the workpiece and a modified region that surrounds a lateral side of the pore, by irradiating the workpiece with the laser beam in a state in which a focal point of the laser beam is positioned to an inside of the workpiece and an etching step of etching the plurality of shield tunnels by an etchant. In the shield tunnel forming step, a plurality of shield tunnels are formed in a first shield tunnel region having a first length along a line-shaped first processing-planned region set on one surface of the workpiece, and a plurality of shield tunnels are formed in a second shield tunnel region that has a second length along a line-shaped second processing-planned region set in a region that is different from a region on an extension line of the first processing-planned region and is adjacent to the first processing-planned region on the one surface and that partly overlaps with the first shield tunnel region when the workpiece is viewed in a direction that goes from the first processing-planned region to the second processing-planned region.

Preferably, the shield tunnel forming step includes a first shield tunnel forming step of forming a plurality of first shield tunnel regions at first intervals along the first processing-planned region by alternately forming irradiated regions and unirradiated regions of the laser beam and a second shield tunnel forming step of forming a plurality of second shield tunnel regions at second intervals along the second processing-planned region by alternately forming the irradiated regions and the unirradiated regions.

Preferably, the workpiece is formed of glass.

Preferably, the manufacturing method of a plate-shaped object further includes a filling step of filling, with resin, spaces formed in the first shield tunnel region and the second shield tunnel region after the etching step.

In accordance with another aspect of the present invention, there is provided a plate-shaped object that is formed of a hard material and is capable of being bent by an external force. The plate-shaped object includes a first shield tunnel region that has a plurality of shield tunnels each including a pore formed along a thickness direction of the plate-shaped object and has a first length along a line-shaped first processing-planned region set on one surface of the plate-shaped object and a second shield tunnel region that has a plurality of shield tunnels and has a second length along a line-shaped second processing-planned region set in a region that is different from a region on an extension line of the first processing-planned region and is adjacent to the first processing-planned region on the one surface. The first shield tunnel region and the second shield tunnel region partly overlap when the plate-shaped object is viewed in a direction that goes from the first processing-planned region to the second processing-planned region.

The manufacturing method of a plate-shaped object according to the aspect of the present invention includes the shield tunnel forming step. In the shield tunnel forming step, plural shield tunnels are formed in the first shield tunnel region having the first length along the line-shaped first processing-planned region set on the one surface of the workpiece, and plural shield tunnels are formed in the second shield tunnel region having the second length along the line-shaped second processing-planned region set in a region that is different from a region on an extension line of the first processing-planned region and is adjacent to the first processing-planned region on the one surface. The first shield tunnel region and the second shield tunnel region partly overlap when the workpiece is viewed in the direction that goes from the first processing-planned region to the second processing-planned region. This allows the plate-shaped object to be deformed along the direction that goes from the first processing-planned region to the second processing-planned region. Furthermore, the thickness of the workpiece does not change between before and after the shield tunnel forming step. Therefore, the strength and the flexibility of the plate-shaped object can be balanced.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
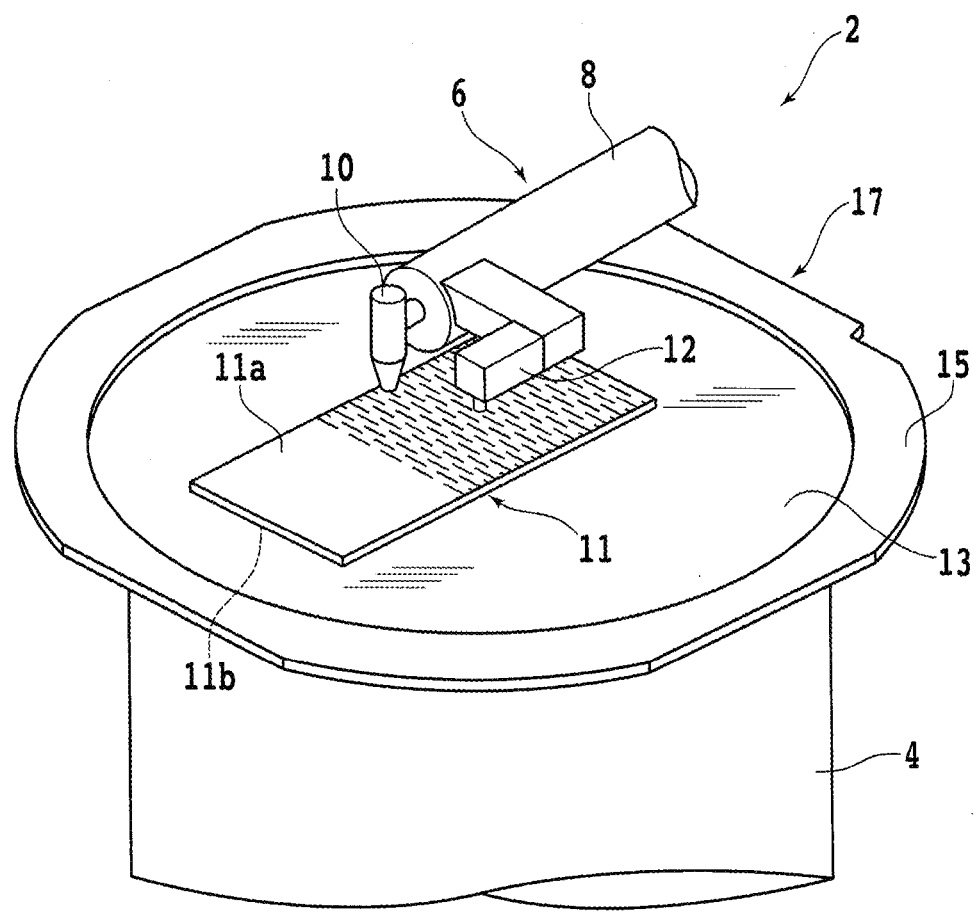
FIG. 1 is a perspective view of a laser processing apparatus.

A first embodiment according to one aspect of the present invention will be described with reference to the accompanying drawings. FIG. 1 is a perspective view of a laser processing apparatus 2. In the following description, an X-axis direction (processing feed direction), a Y-axis direction (indexing feed direction), and a Z-axis direction (height direction, upward-downward direction) are directions orthogonal to each other. The laser processing apparatus 2 has a chuck table 4. An output shaft of a rotational drive source (not illustrated) such as a motor is coupled to a lower side of the chuck table 4. The output shaft is disposed substantially in parallel to the Z-axis direction. When the rotational drive source is operated, the chuck table 4 can rotate around the output shaft.

A Y-axis movement unit (not illustrated) of a ball screw system that moves the rotational drive source and the chuck table 4 in the Y-axis direction is disposed under the rotational drive source. This Y-axis movement unit is disposed over an X-axis movement unit (not illustrated) of a ball screw system. The X-axis movement unit moves the Y-axis movement unit, the rotational drive source, and the chuck table 4 along the X-axis direction. The chuck table 4 has a frame body (not illustrated) that is formed of metal and has a circular disc shape.

A recessed part with a circular disc shape is formed at an upper part of the frame body, and a porous plate that is formed of porous ceramic and has a circular disc shape is fixed to this recessed part. The porous plate is connected to a suction source (not illustrated) such as an ejector through a flow path (not illustrated) formed inside the frame body. A negative pressure generated by the suction source is transmitted to an upper surface of the porous plate through the flow path. The upper surface of the porous plate and the upper surface of the frame body are substantially flush with each other and function as a holding surface 4a (see FIG. 3A and so forth) substantially parallel to the X-Y plane.

A workpiece 11 is formed of a hard material that is transparent to a visible light. The workpiece 11 in the present embodiment is formed of quartz glass. However, the workpiece 11 can be formed of various kinds of glass including borosilicate glass, aluminosilicate glass, soda-lime glass, non-alkali glass, and other kinds of optical glass. Furthermore, the workpiece 11 may be formed of a crystalline material (crystallized quartz, sapphire, or the like) that is transparent with respect to a visible light wavelength besides the glass. For example, the workpiece 11 has a rectangular plate shape in which the length of long sides is 40 mm, the length of short sides is 10 mm, and the thickness is 1 mm. The thickness of the workpiece 11 is set as appropriate according to desired strength.

In one surface 11a of the workpiece 11, plural processing-planned regions each having a line shape (straight line shape, curved line shape, or line segment shape) are set in such a manner as to be separated in a predetermined direction. Each processing-planned region may be set in advance in design data that the laser processing apparatus 2 is made to read or may be virtually set in the field of view of imaging of a camera, or the like. The plural processing-planned regions in the present embodiment include first processing-planned regions 11c and second processing-planned regions 11d that are each set from one of the long sides of the workpiece 11 to the other along the short sides and have a straight line shape (see FIG. 6 and so forth). The first processing-planned region 11c and the second processing-planned region 11d are set to be separated from each other by a predetermined distance in the long-side direction of the workpiece 11. That is, the second processing-planned region 11d is adjacent to the first processing-planned region 11c not on an extension line of the first processing-planned region 11c but in the direction orthogonal to the first processing-planned region 11c (see FIG. 6 and so forth). The distance (pitch) between the first processing-planned region 11c and the second processing-planned region 11d is set to a predetermined value of at least 10 μm and at most 1000 μm, for example.

When laser processing is executed for the workpiece 11, as preliminary preparation, an adhesive tape (dicing tape) 13 that has a larger diameter than the workpiece 11 and is formed of resin is stuck to the side of the other surface 11b of the workpiece 11. Moreover, an annular frame 15 formed of metal is stuck to the peripheral part of the adhesive tape 13. As a result, a workpiece unit 17 in which the workpiece 11 is supported by the frame 15 through the adhesive tape 13 is formed.

A laser beam irradiation unit 6 is disposed over the holding surface 4a on which the workpiece 11 is held under suction. The laser beam irradiation unit 6 has a cylindrical casing 8 disposed substantially in parallel to the Y-axis direction. A Z-axis movement unit (not illustrated) is coupled to part of the casing 8. The height position of the casing 8 is adjusted by the Z-axis movement unit. The laser beam irradiation unit 6 has a laser oscillator (not illustrated) that oscillates a laser. The laser oscillator contains a rod-shaped laser medium formed of Nd:YAG or Nd:YVO$_4$. The laser oscillator emits a pulsed laser beam having such a wavelength as to be transmitted through the workpiece 11 (for example, 1,030 nm, 1,064 nm, or the like).

The laser beam is incident on an acousto-optic modulator (not illustrated; hereinafter abbreviated as AOM on the basis of the first letters of the acousto-optic modulator). The AOM can alternately set irradiation periods of the laser beam and non-irradiation periods of the laser beam by interrupting irradiation of the workpiece 11 with the laser beam at certain time intervals. In this manner, the irradiation periods and the non-irradiation periods are alternately repeated regarding the laser beam. The laser beam is output from a collecting lens in a processing head 10 located at the tip part of the laser beam irradiation unit 6 toward the holding surface 4a substantially perpendicularly.

Figure 3A:
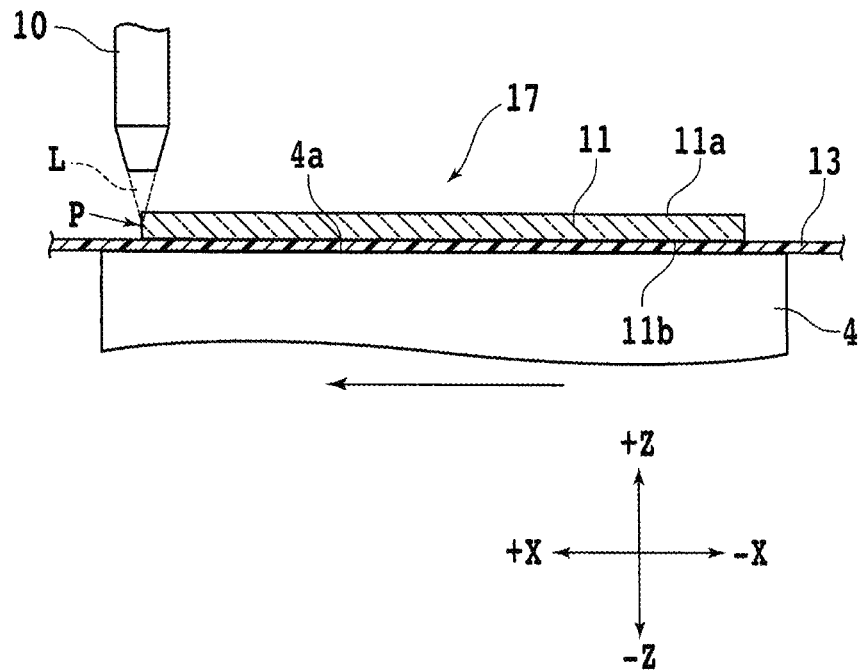
FIG. 3A is a partial sectional side view of a workpiece that has not yet undergone laser processing.

As illustrated in FIG. 3A, a focal point P of a laser beam L output from the processing head 10 is positioned to a predetermined depth in the workpiece 11. When the focal point P and the workpiece 11 held by the holding surface 4a are relatively moved in the X-axis direction, the workpiece 11 is processed along a movement path of the focal point P. According to the irradiation periods and the non-irradiation periods of the laser beam L that are alternately repeated, irradiated regions $R_A$ and unirradiated regions $R_B$ are alternately formed in the workpiece 11 along the movement path of the focal point P (see FIG. 3B). The ratio of the irradiated region $R_A$ to the unirradiated region $R_B$ (that is, $R_A/R_B$) is adjusted to a predetermined value of at least 1 and at most 3, for example. However, the value of this ratio can be set as appropriate by adjusting the operation of the AOM.

As illustrated in FIG. 1, an imaging unit 12 is disposed near the processing head 10. The imaging unit 12 includes an objective lens and an image sensor (neither is illustrated) and so forth. For example, the imaging unit 12 images the workpiece 11 held by the holding surface 4a. An image obtained by the imaging is used for determination of the first processing-planned regions 11c and the second processing-planned regions 11d, determination of the irradiated regions $R_A$ and the unirradiated regions $R_B$, determination of the irradiation position of the laser beam L, positioning of the workpiece 11, and so forth.

The laser processing apparatus 2 has a control part (not illustrated) that controls operation of the X-axis movement unit, the Y-axis movement unit, the rotational drive source, the chuck table 4, the Z-axis movement unit, the laser oscillator, the AOM, the imaging unit 12, and so forth. For example, the control part includes a computer including a processor (processing device) typified by a central processing unit (CPU), a main storing device such as a dynamic random access memory (DRAM), a static random access memory (SRAM), and a read only memory (ROM), and an auxiliary storing device such as a flash memory, a hard disk drive, and a solid-state drive.

Software including a predetermined program is stored in the auxiliary storing device. Functions of the control part are implemented by causing the processing device and so forth to operate in accordance with this software. An input section (not illustrated) to which design data is input is set in the control part. The design data includes data that indicates the laser processing region of the workpiece 11. For example, the design data includes computer-aided design (CAD) data. The control part controls operation of the AOM, the chuck table 4, and so forth on the basis of the design data input to the input section and executes laser processing of the workpiece 11.

Figure 2:
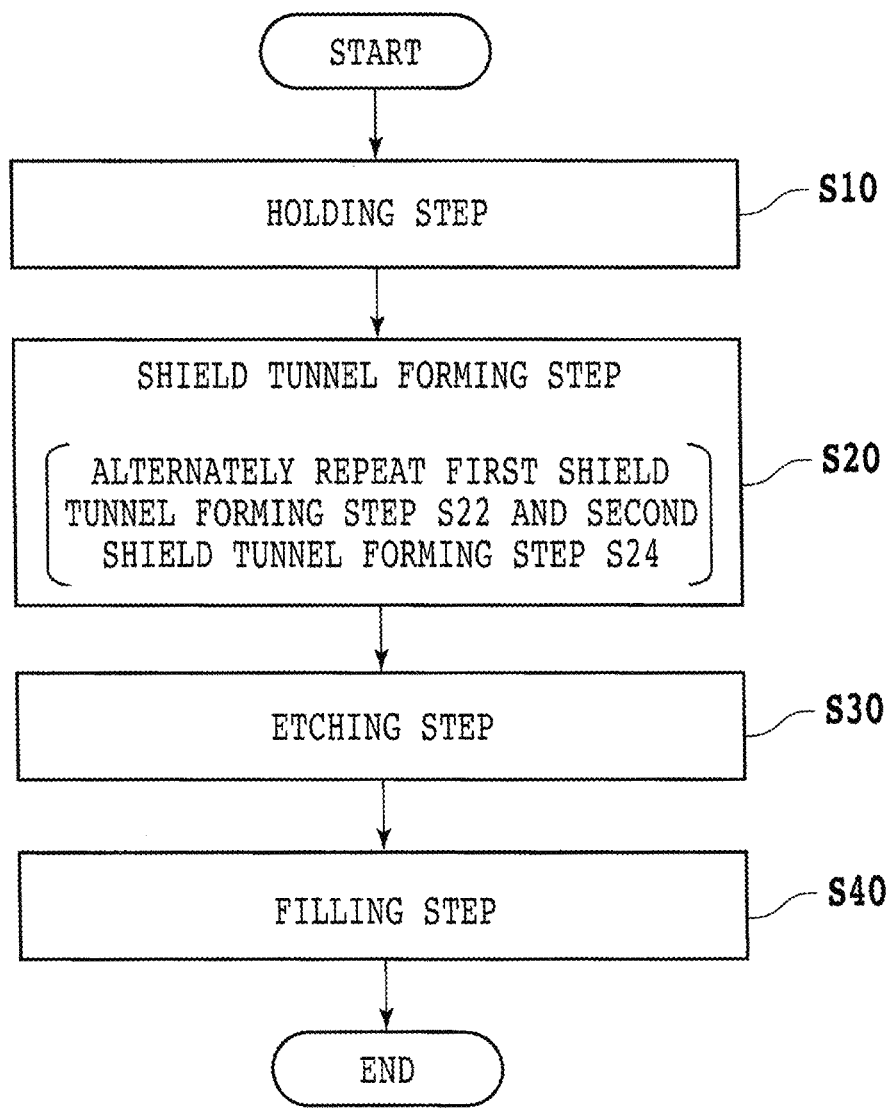
FIG. 2 is a flowchart illustrating a manufacturing method of a plate-shaped object.

Next, a manufacturing method in which the workpiece 11 is processed by the laser beam L to manufacture a plate-shaped object 23 (see FIG. 6, FIG. 7, and so forth) that can be bent by an external force will be described with reference to FIG. 2 to FIG. 7. FIG. 2 is a flowchart illustrating the manufacturing method of the plate-shaped object 23. In the present embodiment, first, the workpiece unit 17 is held by the holding surface 4a (holding step S10) (see FIG. 3A). FIG. 3A is a partial sectional side view of the workpiece 11 that has not yet undergone laser processing, in the case in which the side surface of the short side of the workpiece 11 is viewed.

After the holding step S10, plural shield tunnels are formed in the workpiece 11 by irradiating the workpiece 11 with the laser beam L (shield tunnel forming step S20). In the shield tunnel forming step S20, first, the rotation angle of the chuck table 4 is adjusted as appropriate, and the focal point P is positioned onto an extension line of a processing-planned region. Then, the Z-axis movement unit and so forth are operated, and the focal point P is positioned to the inside of the workpiece 11. When the chuck table 4 is moved along the X-axis direction in this state, laser processing of the workpiece 11 is executed along the processing-planned region.

Figure 3B:
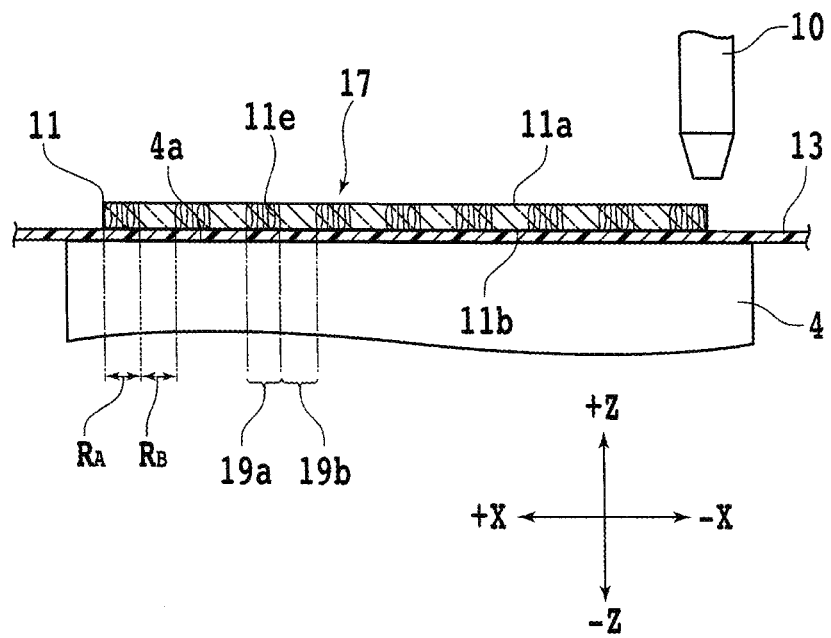
FIG. 3B is a partial sectional side view of the workpiece that has undergone the laser processing.
Figure 4A:
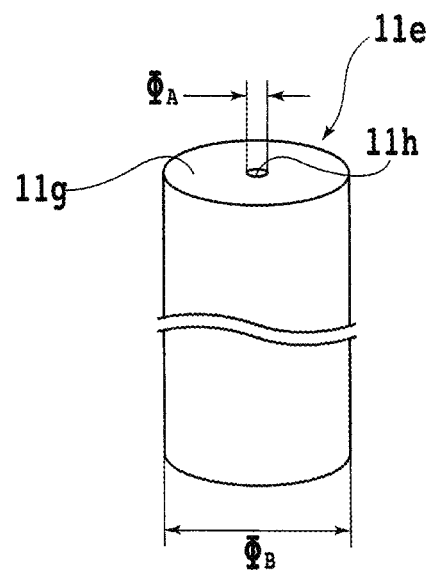
FIG. 4A is a perspective view illustrating a structure of one shield tunnel.
Figure 4B:
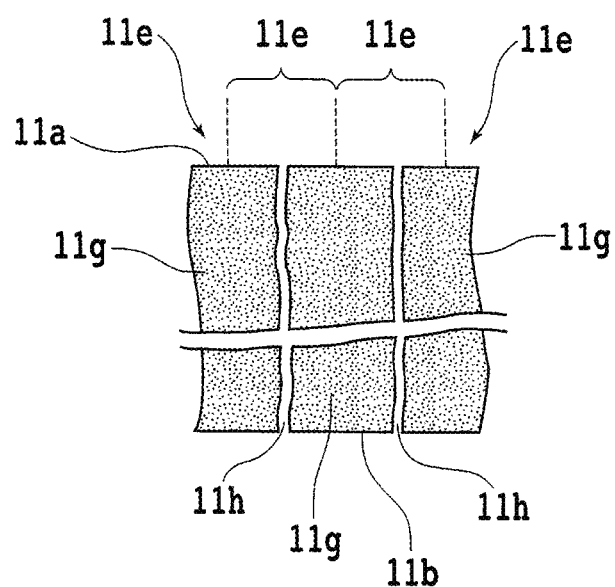
FIG. 4B is a sectional view of part of the workpiece in which plural shield tunnels are illustrated.

FIG. 3B is a partial sectional side view of the workpiece 11 that has undergone the laser processing, in the case in which the side surface of the short side of the workpiece 11 is viewed. Plural shield tunnels 11e are formed in the irradiated region $R_A$, and the irradiated region $R_A$ becomes a first shield tunnel region 19a. In contrast, the shield tunnel 11e is not formed at all in the unirradiated region $R_B$. The unirradiated region $R_B$ becomes a first unprocessed region 19b. FIG. 4A is a perspective view illustrating the structure of one shield tunnel 11e. FIG. 4B is a sectional view of part of the workpiece 11 in which the plural shield tunnels 11e are illustrated. In FIG. 4A and FIG. 4B, part of the workpiece 11 is omitted in the thickness direction.

Each shield tunnel 11e has a pore 11h formed along the thickness direction of the workpiece 11. The pore 11h is an elongated space with a substantially circular column shape, and, for example, a diameter $\Phi_A$ thereof is substantially 1 μm. Typically, the pore 11h penetrates the workpiece 11 in the thickness direction. The shield tunnel 11e further has a modified region 11g formed to surround the lateral side of the pore 11h. The modified region 11g is a region with a substantially circular column shape, and, for example, a diameter $\Phi_B$ thereof is a predetermined value of at least 5 μm and at most 20 μm.

The modified region 11g is a region that involves a change in the structure, the density, and so forth compared with the first unprocessed region 19b, which is not irradiated with the laser beam L, and, for example, has lower corrosion resistance against the etchant than the first unprocessed region 19b. The plural shield tunnels 11e are formed along the first processing-planned region 11c. The modified regions 11g of adjacent two shield tunnels 11e are connected to each other as illustrated in FIG. 4B, for example. Yet, the two modified regions 11g may be separated from each other.

Figure 5A:
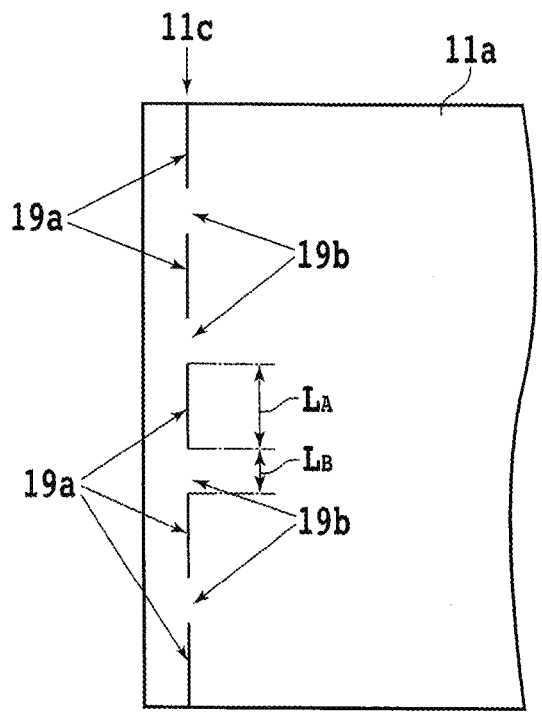
FIG. 5A is a diagram illustrating a first shield tunnel forming step.

In the shield tunnel forming step S20, by executing irradiation with the laser beam L along the first processing-planned region 11c, plural first shield tunnel regions 19a are formed in such a manner that the first unprocessed regions 19b are each interposed between the first shield tunnel regions 19a as illustrated in FIG. 5A (first shield tunnel forming step S22). FIG. 5A is a diagram illustrating the first shield tunnel forming step S22. In the first shield tunnel forming step S22, one point on the long side of the workpiece 11 is employed as the starting point, and formation of the first shield tunnel region 19a is started along the first processing-planned region 11c.

The ratio of a length (first interval) $L_B$ of the first unprocessed region 19b along the first processing-planned region 11c to a length (first length) $L_A$ of the first shield tunnel region 19a along the first processing-planned region 11c (that is, $L_A/L_B$) is the same as ($R_A/R_B$). After the first shield tunnel forming step S22, indexing feed of the chuck table 4 is executed by a predetermined pitch $L_C$ (see FIG. 5B), and the focal point P of the laser beam L is positioned to the second processing-planned region 11d.

Figure 5B:
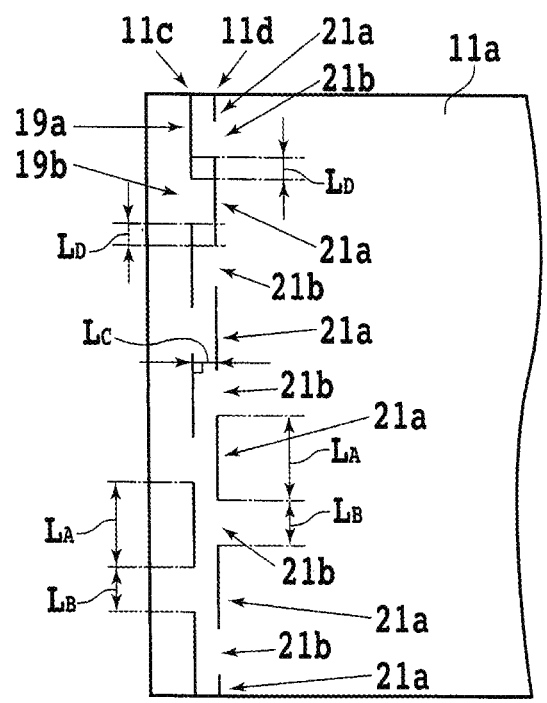
FIG. 5B is a diagram illustrating a second shield tunnel forming step.

Then, by executing irradiation with the laser beam L along the second processing-planned region 11d, plural second shield tunnel regions 21a are formed in such a manner that second unprocessed regions 21b are each interposed between the second shield tunnel regions 21a as illustrated in FIG. 5B (second shield tunnel forming step S24). FIG. 5B is a diagram illustrating the second shield tunnel forming step S24. Similarly to the first shield tunnel region 19a, the second shield tunnel region 21a also has plural shield tunnels 11e.

The ratio of a length (second interval) $L_B$ of the second unprocessed region 21b along the second processing-planned region 11d to a length (second length) $L_A$ of the second shield tunnel region 21a along the second processing-planned region 11d ($L_A/L_B$) is the same as ($R_A/R_B$). The formation start position of the second shield tunnel region 21a in the present embodiment is shifted from the first shield tunnel region 19a in the short-side direction. Thus, the second shield tunnel region 21a located in the vicinity of the long side is shorter than the first shield tunnel region 19a. However, in the present embodiment, the length of the second shield tunnel region 21a means not the length of the second shield tunnel region 21a in contact with the long side but the length of the second shield tunnel region 21a that is not in contact with the long side.

Due to the shift of the formation start position of the second shield tunnel region 21a in the short-side direction, as illustrated in FIG. 5B, one first shield tunnel region 19a and one second shield tunnel region 21a partly overlap when the workpiece 11 is viewed in the direction that goes from the first processing-planned region 11c to the second processing-planned region 11d (overlap length $L_D$). The second shield tunnel region 21a in the present embodiment is disposed in such a manner that the center of the second shield tunnel region 21a in the longitudinal direction corresponds with the center of the first unprocessed region 19b in the longitudinal direction in the direction that goes from the first processing-planned region 11c to the second processing-planned region 11d. Furthermore, the first shield tunnel region 19a in the present embodiment is disposed in such a manner that the center of the first shield tunnel region 19a in the longitudinal direction corresponds with the center of the second unprocessed region 21b in the longitudinal direction in the direction that goes from the first processing-planned region 11c to the second processing-planned region 11d.

Laser processing conditions in the first shield tunnel forming step S22 and the second shield tunnel forming step S24 are set as follows, for example.

Laser oscillator: Nd:YAG pulse laser
Wavelength: 1,030 nm
Pulse energy: 60 μJ
Processing feed rate: 100 mm/s By repeating the first shield tunnel forming step S22 and the second shield tunnel forming step S24, plural first shield tunnel regions 19a and plural second shield tunnel regions 21a are alternately formed along the long-side direction of the workpiece 11.

Figure 6:
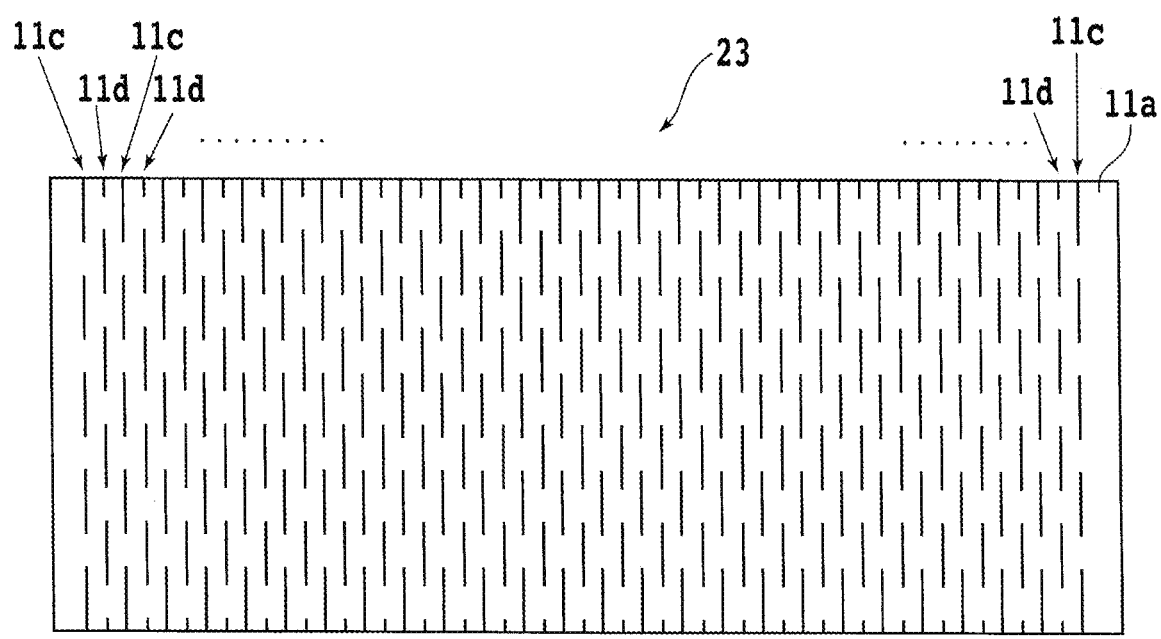
FIG. 6 is a top view of the workpiece that has undergone a shield tunnel forming step.
Figure 7:
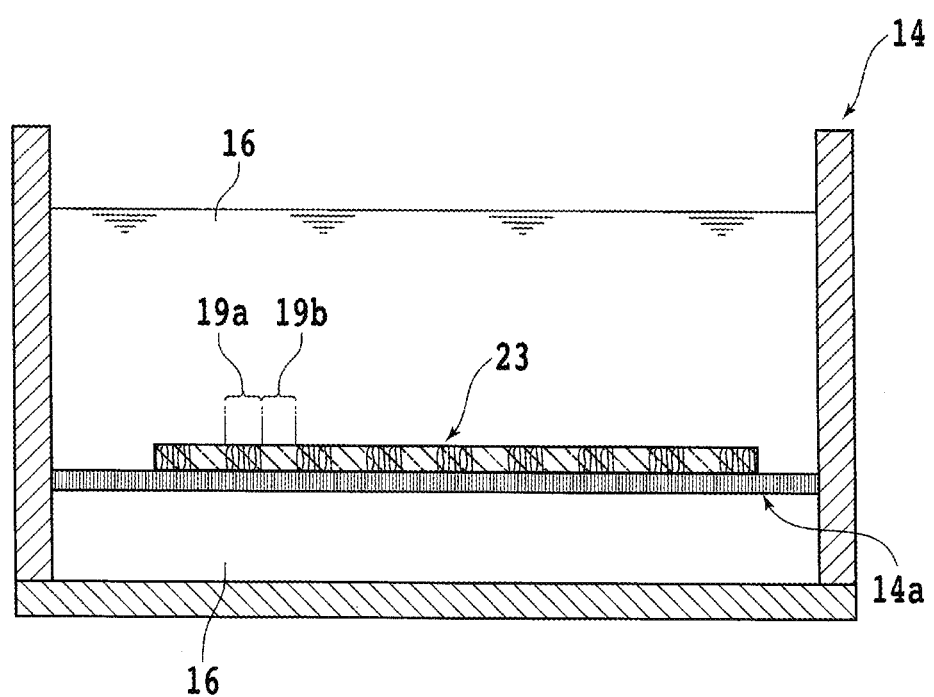
FIG. 7 is a diagram illustrating an etching step.

FIG. 6 is a top view of the workpiece 11 that has undergone the shield tunnel forming step S20 (that is, the plate-shaped object 23). After the laser processing, the plate-shaped object 23 is separated from the adhesive tape 13, and wet etching is executed for the plate-shaped object 23 (etching step S30). FIG. 7 is a diagram illustrating the etching step S30. In the etching step S30, for example, a container 14 having corrosion resistance against an etchant 16 is used. A support member 14a on which the plate-shaped object 23 is placed is disposed at a predetermined height position from the bottom surface of the container 14.

The support member 14a in the present embodiment is a wire net made of metal having corrosion resistance. The container 14 is filled with the etchant 16 of such liquid as hydrofluoric acid or an aqueous solution of potassium hydroxide until a predetermined height position with which the support member 14a is sufficiently immersed is reached. An ultrasonic oscillator (not illustrated) is fixed to the bottom surface of the outside of the container 14. The ultrasonic oscillator gives ultrasonic vibrations to the workpiece 11 placed on the support member 14a. Stirring, shaking, vibrating, heating, or the like of the etchant 16 may be executed instead of giving ultrasonic vibrations or in addition to this.

In the etching step S30, the plate-shaped object 23 is immersed in the container 14 filled with the etchant 16, and the modified region 11g of each shield tunnel 11e is at least partly etched and removed by the etchant 16. However, the thickness of the plate-shaped object 23 does not change at this time. Etching conditions are set as follows, for example. However, the immersion time may be changed as appropriate according to the concentration and the temperature of the etchant 16, whether or not ultrasonic vibrations are given, and so forth.

Etchant: hydrofluoric acid
Concentration: 38%
Temperature: room temperature
Immersion time: 10 minutes
Ultrasonic vibrations: given In the etching step S30, the modified region 11g is removed at least partly. Due to this, the diameter $\Phi_A$ of the pore 11h enlarges, and the pore 11h penetrates the workpiece 11 in the thickness direction. Thus, the flexibility of the plate-shaped object 23 improves compared with that before the etching. As described above, in the present embodiment, the thickness of the plate-shaped object 23 is set to a thickness that allows ensuring of the strength. In addition, the plate-shaped object 23 becomes capable of being deformed along the direction that goes from the first processing-planned region 11c to the second processing-planned region 11d. Thus, the strength and the flexibility of the plate-shaped object 23 can be balanced. The plate-shaped object 23 that has not yet undergone the etching step S30 also has a certain degree of flexibility although the degree is low compared with the plate-shaped object 23 that has undergone the etching step S30. Therefore, it can be said that the strength and the flexibility can be balanced also in the plate-shaped object 23 that has not yet undergone the etching step S30.

After the etching step S30, the plate-shaped object 23 is taken out from the container 14, and spaces such as the pores 11h formed in the first shield tunnel regions 19a and the second shield tunnel regions 21a are filled with resin 25 (filling step S40). However, the filling step S40 is not an essential step and may be omitted. In the filling step S40, first, the side of the other surface 11b of the plate-shaped object 23 is directly held under suction by a jig having a holding surface according to the shape of the plate-shaped object 23 that is bent. Next, the resin 25 is applied to the first shield tunnel regions 19a and the second shield tunnel regions 21a to fill these regions with the resin 25. As the resin 25, transparent natural or synthetic resin having a refractive index close to the refractive index of quartz glass (predetermined value of at least 1.40 and at most 1.55) can be used. For example, silicone rubber, silicone resin, or the like that is transparent and has flexibility is used as the resin 25.

Figure 8:
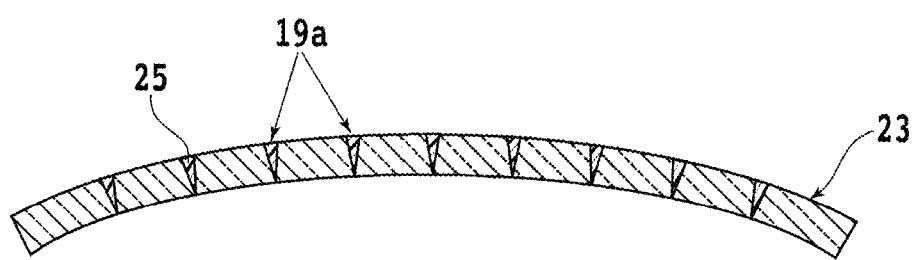
FIG. 8 is a sectional view of a plate-shaped object in which spaces are filled with resin.

FIG. 8 is a sectional view of the plate-shaped object 23 in which the first shield tunnel regions 19a are filled with the resin 25. In FIG. 8, a section along the long side of the plate-shaped object 23 is illustrated. By filling the first shield tunnel regions 19a and the second shield tunnel regions 21a with the resin 25, while the strength and the flexibility of the plate-shaped object 23 are balanced, a striped pattern corresponding to the first shield tunnel regions 19a and the second shield tunnel regions 21a (see FIG. 9A, FIG. 9B, and FIG. 10) can be reduced or removed. Incidentally, when there is no need to keep the plate-shaped object 23 at such a form as to be capable of being bent into any shape and the shape of the plate-shaped object 23 may be fixed at a predetermined bending shape, polymethyl methacrylate, which is transparent but has comparatively lower flexibility, or the like, may be used as the resin 25.

Figure 9A:
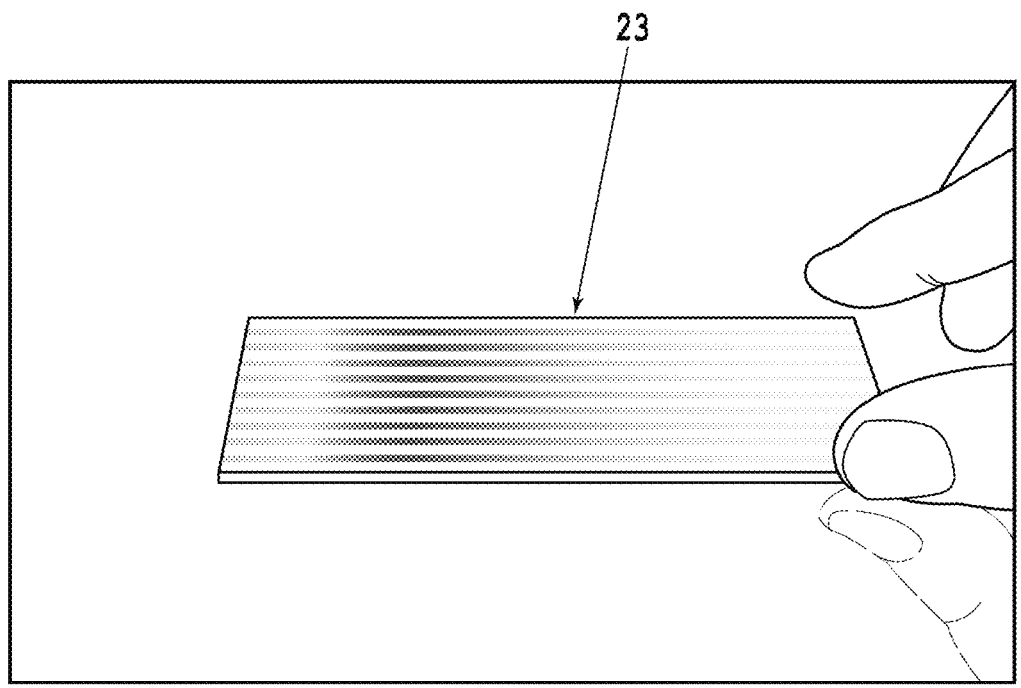
FIG. 9A is an image illustrating the whole of one surface side of the plate-shaped object.
Figure 9B:
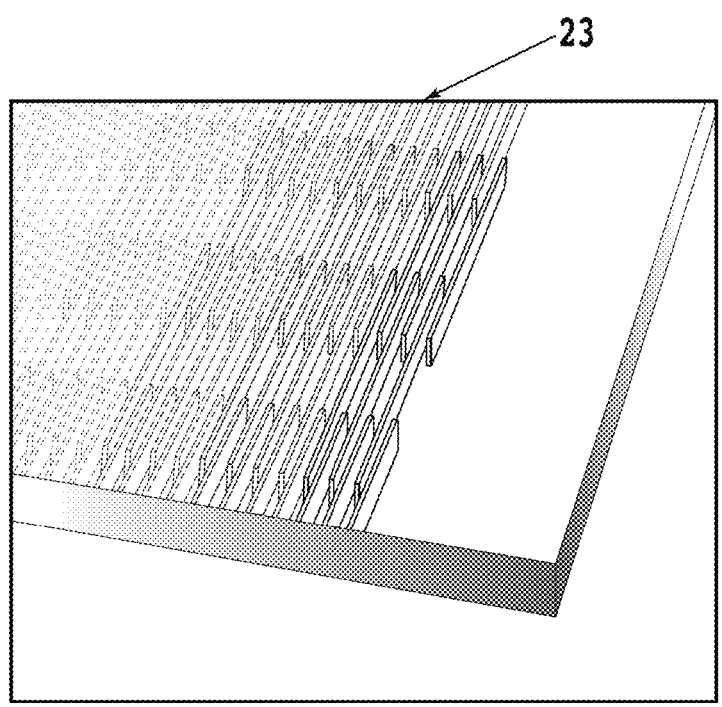
FIG. 9B is an image in which a corner part of the one surface side of the plate-shaped object is enlarged.
Figure 10:
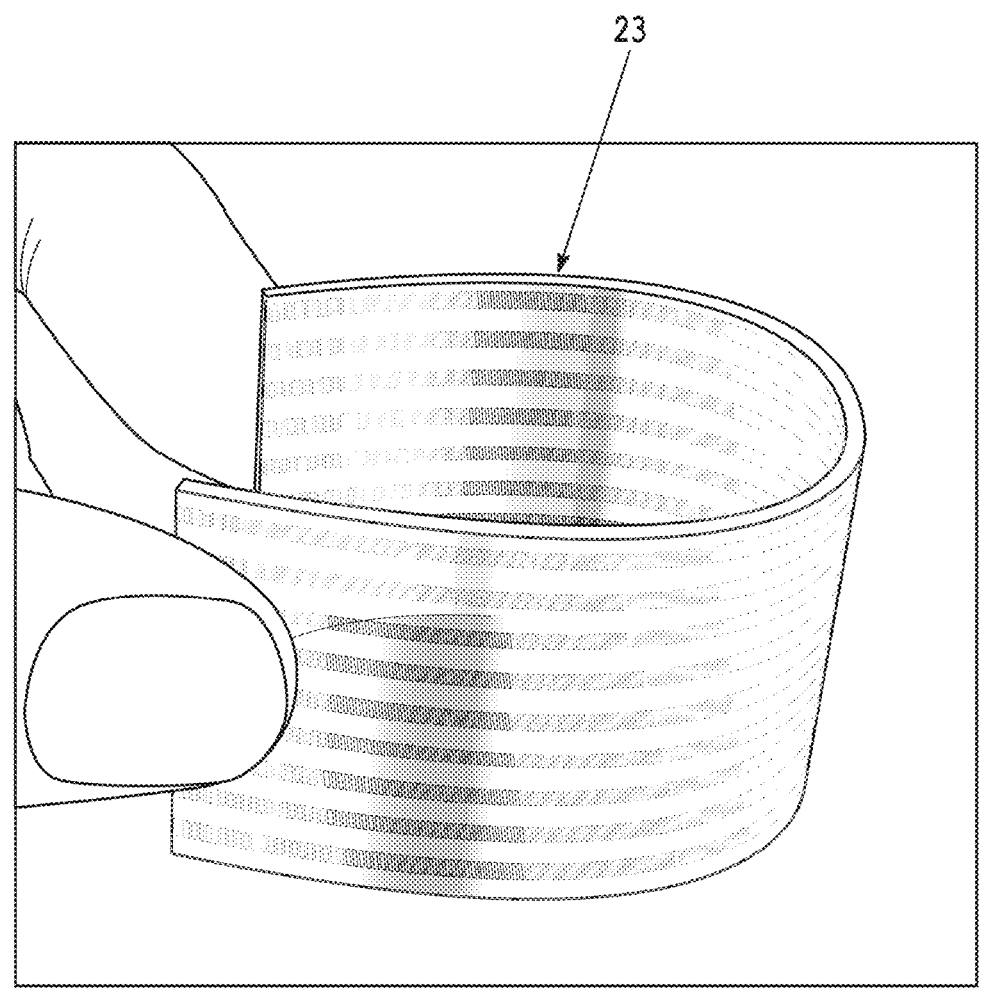
FIG. 10 is an image of the state in which the plate-shaped object is bent by a hand of a person.

FIG. 9A is an image illustrating the whole of the side of the one surface 11a of the plate-shaped object 23 that has undergone the etching step S30 but not the filling step S40. Further, FIG. 9B is an image in which a corner part of the side of the one surface 11a of the plate-shaped object 23 that has undergone the etching step S30 but not the filling step S40 is enlarged. FIG. 10 is an image of the state in which the plate-shaped object 23 that has undergone the etching step S30 but not the filling step S40 is bent by a hand of a person. The plate-shaped object 23 illustrated in FIG. 9A, FIG. 9B, and FIG. 10 corresponds to the plate-shaped object 23 explained with FIG. 6. In the first embodiment, the first shield tunnel region 19a and the second shield tunnel region 21a are made to partly overlap in the long-side direction of the plate-shaped object 23. Due to this, the thickness of the plate-shaped object 23 can be set to a thickness that allows ensuring of the strength, and the plate-shaped object 23 can be bent along the long-side direction of the plate-shaped object 23. Thus, the strength and the flexibility of the plate-shaped object 23 can be balanced.

Figure 11:
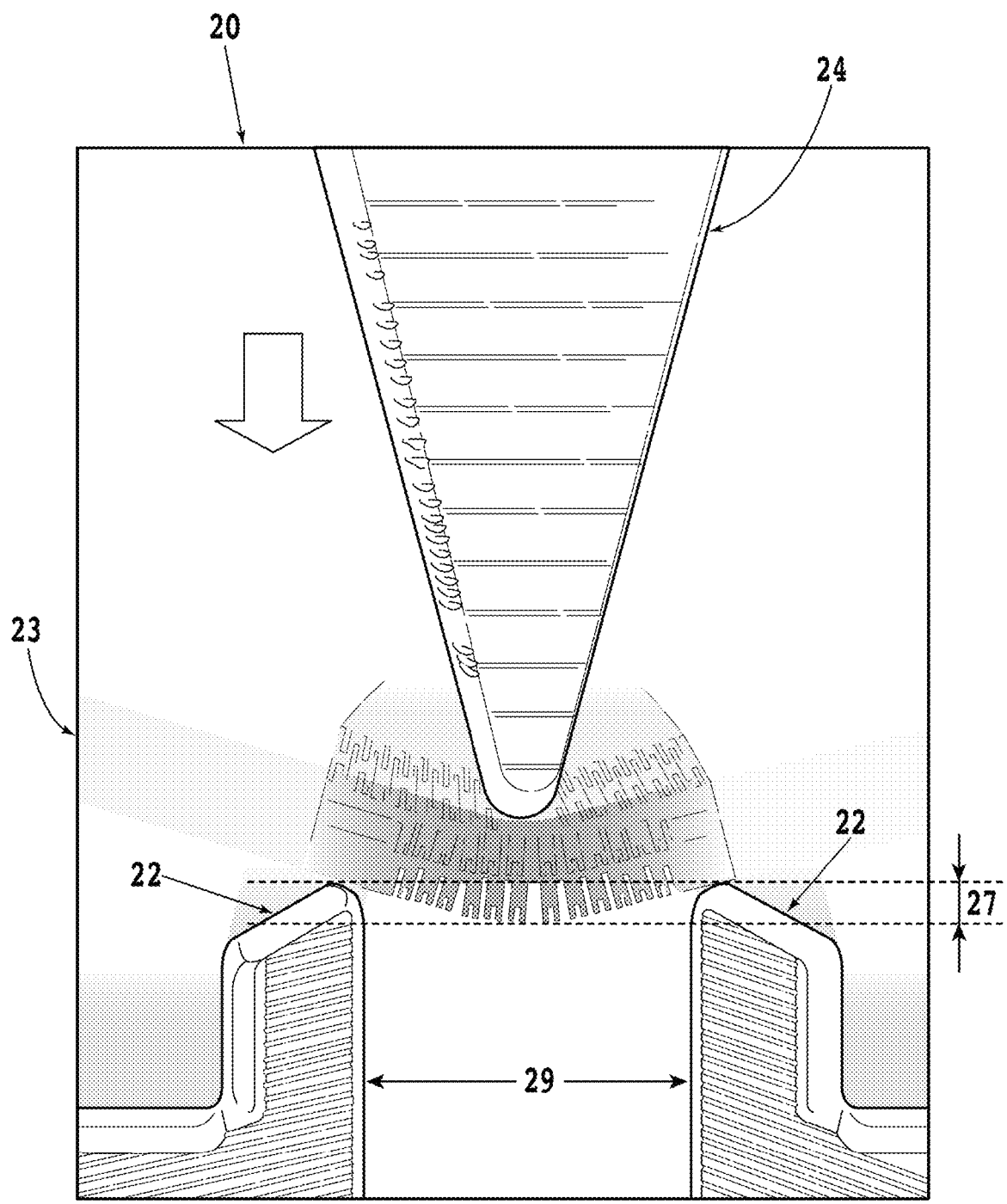
FIG. 11 is an image illustrating an appearance of a three-point bending test.

Next, description will be made about a three-point bending test executed on the plate-shaped object 23 that has undergone the etching step S30 but not the filling step S40, by using a test apparatus 20. FIG. 11 is an image illustrating the appearance of the three-point bending test for measuring an amount 27 of deflection of the plate-shaped object 23. In the three-point bending test, the plate-shaped object 23 in which the length of the long sides is 42 mm, the length of the short sides is 10 mm, and the thickness is 1 mm was used. In a range of a width of 4 mm at a central part of the plate-shaped object 23 in the short-side direction, plural first shield tunnel regions 19a and plural second shield tunnel regions 21a were formed along not the short-side direction but the long-side direction of the plate-shaped object 23. In ranges of 3 mm on both sides of the plate-shaped object 23 in the short-side direction, neither the first shield tunnel region 19a nor the second shield tunnel region 21a was formed. The overlap rate was adjusted by setting the length $L_A$ of the first shield tunnel region 19a and the second shield tunnel region 21a to a predetermined value of at least 3 mm and at most 7 mm and setting the length $L_B$ to a predetermined value of at least 1.5 mm and at most 2.5 mm. The pitch $L_C$ was adjusted in a range of 100 μm to 300 μm inclusive.

Figure 12A:
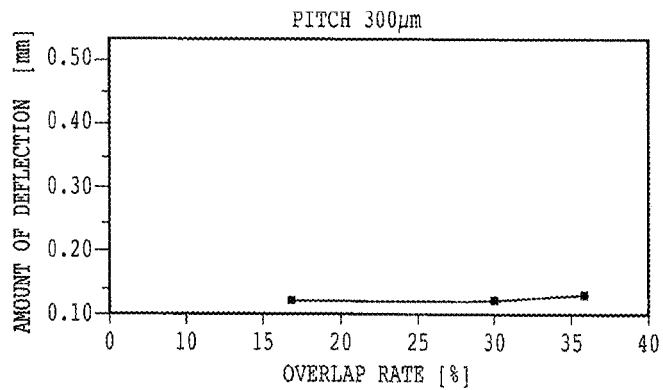
FIG. 12A is a graph illustrating a first experiment.

In the three-point bending test, first, a distance 29 between fulcrums of support parts 22 at two places was set to 4.0 mm, and the plate-shaped object 23 was placed on the two fulcrums in such a manner that the other surface 11b was oriented upward and the central part of the plate-shaped object 23 in the short-side direction was located between the fulcrums. Then, the side of the other surface 11b of the plate-shaped object 23 was pressed by a pressing element 24 in which the radius of the tip was 0.30 mm. At this time, the pressing force of the pressing element 24 was set to 1 N, and the amount 27 of deflection (that is, the amount of bending) of the plate-shaped object 23 when the pressing force of 1 N and the restoring force of the plate-shaped object 23 that was elastically deformed became an equilibrium state was measured. FIG. 12A is a graph illustrating a first experiment of measurement of the amount 27 of deflection of the plate-shaped object 23. In FIG. 12A, the abscissa axis indicates the overlap rate (%), and the ordinate axis indicates the amount 27 of deflection (μm). In the plate-shaped object 23 used in the first experiment, the pitch $L_C$ was set to 300 μm, and the rate of the overlap length $L_D$ to the length $L_A$ ($L_D/L_A \times 100$=overlap rate) was set to at least 16% and at most 37%.

Figure 12B:
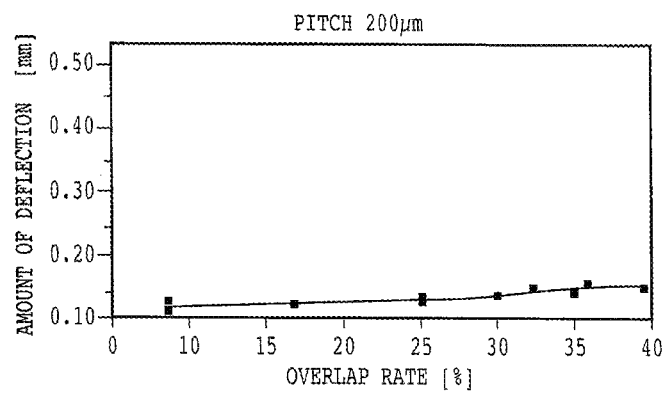
FIG. 12B is a graph illustrating a second experiment.
Figure 12C:
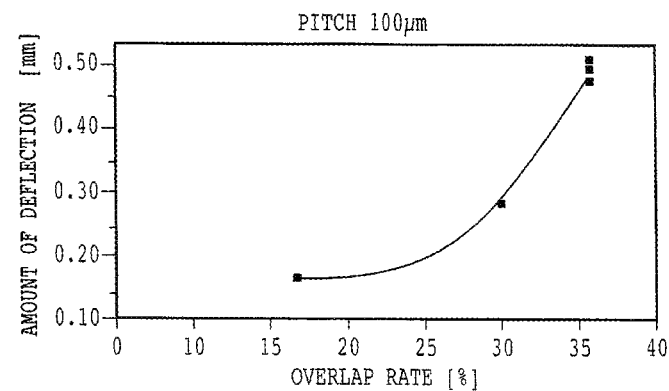
FIG. 12C is a graph illustrating a third experiment.

In the plate-shaped object 23 used in a second experiment, the pitch $L_C$ was set to 200 μm, and the overlap rate was set to at least 8% and at most 40%. FIG. 12B is a graph illustrating the second experiment of measurement of the amount 27 of deflection of the plate-shaped object 23. The abscissa axis and the ordinate axis are the same as FIG. 12A. In the plate-shaped object 23 used in a third experiment, the pitch $L_C$ was set to 100 μm, and the overlap rate was set to at least 16% and at most 37%. FIG. 12C is a graph illustrating the third experiment of measurement of the amount 27 of deflection of the plate-shaped object 23. The abscissa axis and the ordinate axis are the same as FIG. 12A.

As illustrated in FIG. 12A to FIG. 12C, the amount 27 of deflection of the plate-shaped object 23 tended to become larger when the overlap rate was higher. Further, the amount 27 of deflection of the plate-shaped object 23 tended to become larger when the pitch $L_C$ was shorter. The plate-shaped object 23 is bent more readily when the first shield tunnel regions 19a and the second shield tunnel regions 21a each reach the long sides opposed to each other in the one surface 11a of the rectangular shape.

Next, a second embodiment will be described. A workpiece in the second embodiment has a circular disc shape instead of a rectangular shape. The first processing-planned regions 11c and the second processing-planned regions 11d have curved line shapes (more specifically, concentric circles with different diameters) and are alternately set from the center of the one surface 11a toward the outside (see FIG. 13A). That is, the second processing-planned region 11d is adjacent to the first processing-planned region 11c in the direction that goes from the center of the one surface 11a to the outer circumference of the one surface 11a. Next, the processing procedure of the second embodiment will be described.

Also in the second embodiment, first, in the holding step S10, the side of the other surface 11b is held under suction by the holding surface 4a in the state in which the center of the one surface 11a of the workpiece is made to correspond with the rotation center of the holding surface 4a. Subsequently, the shield tunnel forming step S20 is executed. Also in the shield tunnel forming step S20 in the second embodiment, the control part controls operation of the AOM, the chuck table 4, and so forth on the basis of input design data.

In the first shield tunnel forming step S22, one revolution of the chuck table 4 is made while irradiation with the laser beam L is executed in the state in which the focal point P is disposed at a position separate outward from the center of the one surface 11a by a predetermined distance. Subsequently, in the second shield tunnel forming step S24, one revolution of the chuck table 4 is made while irradiation with the laser beam L is executed in the state in which the focal point P is disposed at a position separated outward by the pitch $L_C$. Thereafter, in the state in which the focal point P is disposed at a position further separated outward by the pitch $L_C$, the first shield tunnel forming step S22 is executed again.

Figure 13A:
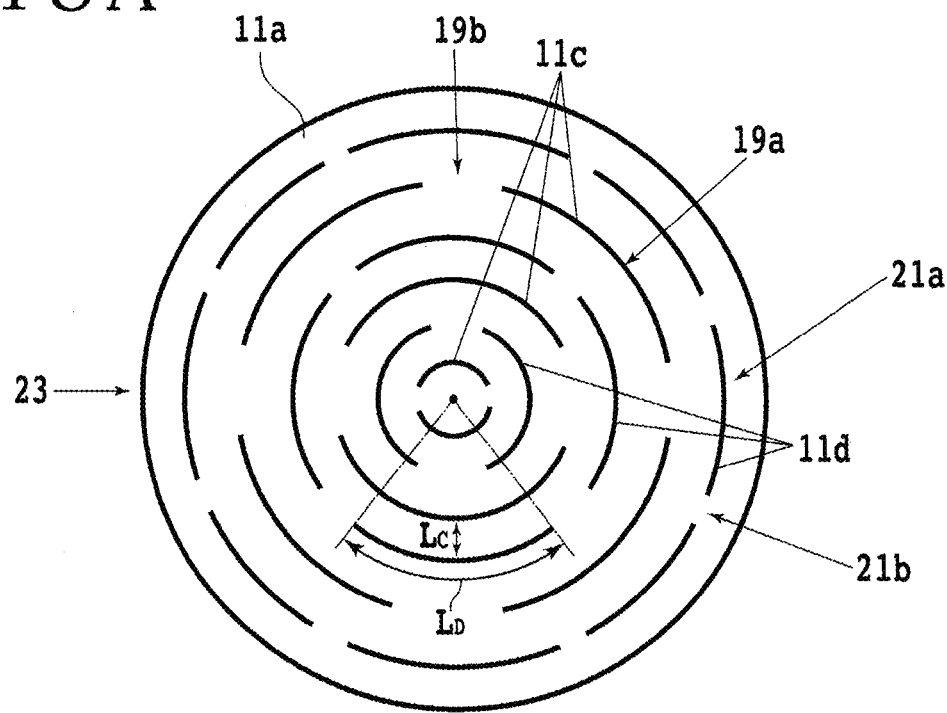
FIG. 13A is a top view of the workpiece that has undergone the shield tunnel forming step in a second embodiment.

In this manner, the first shield tunnel forming step S22 and the second shield tunnel forming step S24 are alternately repeated plural times. FIG. 13A is a top view of the workpiece (that is, the plate-shaped object 23) that has undergone the shield tunnel forming step S20 in the second embodiment. After the shield tunnel forming step S20, the etching step S30 may be executed. As illustrated in FIG. 13A, the first shield tunnel region 19a and the second shield tunnel region 21a partly overlap in the radial direction of the plate-shaped object 23. Also in the second embodiment, the thickness of the plate-shaped object 23 can be set to a thickness that allows ensuring of the strength, and the plate-shaped object 23 can be bent along the radial direction. More specifically, the side of the one surface 11a of the plate-shaped object 23 can be bent in a protruding manner from the outer circumference toward the center. As described above, the strength and the flexibility of the plate-shaped object 23 can be balanced.

Next, a third embodiment will be described. A workpiece in the third embodiment has a circular disc shape but is different from the second embodiment in that the first processing-planned regions 11c and the second processing-planned regions 11d have shapes of a series of line segments corresponding to plural sides of polygons instead of curved line shapes (see FIG. 13B). The second processing-planned region 11d in the third embodiment is adjacent to the first processing-planned region 11c in the direction that goes from the center of the one surface 11a to the outer circumference of the one surface 11a. Next, the processing procedure of the third embodiment will be described.

In the holding step S10, the side of the other surface 11b is held under suction by the holding surface 4a in the state in which the center of the one surface 11a of the workpiece is made to substantially correspond with the rotation center of the holding surface 4a. Subsequently, the shield tunnel forming step S20 is executed. In the first round of the first shield tunnel forming step S22, the focal point P is moved along four sides of the first processing-planned region 11c of a square (first square) while irradiation with the laser beam L is executed in the state in which the focal point P is disposed at a position separated outward from the center of the one surface 11a by a predetermined distance.

In the subsequent first round of the second shield tunnel forming step S24, the focal point P is moved along four sides of the second processing-planned region 11d of a second square larger than the first square while irradiation with the laser beam L is executed in the state in which the focal point P is disposed outside the first square. In the subsequent second round of the first shield tunnel forming step S22, the focal point P is moved along eight sides of the first processing-planned region 11c of a first regular octagon larger than the second square while irradiation with the laser beam L is executed in the state in which the focal point P is disposed outside the second square.

In the subsequent second round of the second shield tunnel forming step S24, the focal point P is moved along eight sides of the second processing-planned region 11d of a second regular octagon larger than the first regular octagon while irradiation with the laser beam L is executed in the state in which the focal point P is disposed outside the first regular octagon. In this manner, the first shield tunnel forming step S22 and the second shield tunnel forming step S24 are alternately repeated plural times. The centers of the above-described squares and octagons are made to correspond with each other.

Figure 13B:
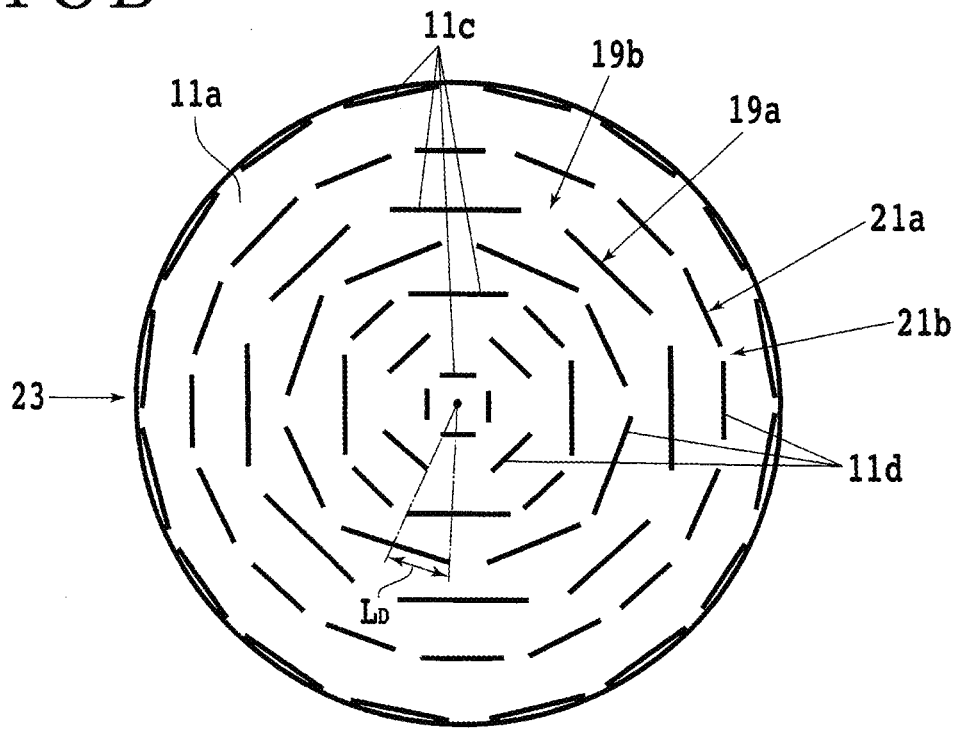
FIG. 13B is a top view of the workpiece that has undergone the shield tunnel forming step in a third embodiment.

FIG. 13B is a top view of the workpiece (that is, the plate-shaped object 23) that has undergone the shield tunnel forming step S20 in the third embodiment. After the shield tunnel forming step S20, the etching step S30 may be executed for the plate-shaped object 23. As illustrated in FIG. 13B, also in the third embodiment, the first shield tunnel region 19a and the second shield tunnel region 21a partly overlap in the direction that goes from the first processing-planned region 11c to the second processing-planned region 11d.

Also in the third embodiment, the thickness of the plate-shaped object 23 can be set to a thickness that allows ensuring of the strength, and the plate-shaped object 23 can be bent along the radial direction. More specifically, the side of the one surface 11a of the plate-shaped object 23 can be bent in a protruding manner from the outer circumference toward the center. As described above, the strength and the flexibility of the plate-shaped object 23 can be balanced. The shapes of the first processing-planned region 11c and the second processing-planned region 11d are not limited to the square and the regular octagon, and any polygons having four or more vertexes may be employed.

Besides, structures, methods, and so forth according to the above-described embodiments can be carried out with appropriate changes without departing from the scope of the object of the present invention. For example, the shape of the workpiece 11 and the plate-shaped object 23 is not limited to the rectangle and the circle, and various shapes such as triangle and other polygons may be employed. Further, the shapes of the first processing-planned region 11c and the second processing-planned region 11d are changed as appropriate according to the form of bending of the plate-shaped object 23. Incidentally, because the pores 11h are formed in the shield tunnel regions of the plate-shaped object 23, it is also possible to use the plate-shaped object 23 as a transparent chuck table in which a holding surface is bent and has recesses and protrusions due to the pores 11h. In addition, it is also possible to use the plate-shaped object 23 as a suction part of a conveying apparatus that sucks and holds a conveyance target.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A manufacturing method of a plate-shaped object in which the plate-shaped object capable of being bent by an external force is manufactured by processing a plate-shaped workpiece formed of a hard material by a pulsed laser beam having such a wavelength as to be transmitted through the workpiece, the manufacturing method comprising:

a shield tunnel forming step of forming, in the workpiece, a plurality of shield tunnels each including a pore formed along a thickness direction of the workpiece and a modified region that surrounds a lateral side of the pore, by irradiating the workpiece with the laser beam in a state in which a focal point of the laser beam is positioned to an inside of the workpiece; and an etching step of etching the plurality of shield tunnels by an etchant, wherein the shield tunnel forming step includes, a first shield tunnel forming step of forming a plurality of first shield tunnel regions extending at first intervals along a line-shaped first processing-planned region set on one planar surface of the workpiece by alternately forming first irradiated regions and first unirradiated regions of the laser beam, and a second shield tunnel forming step of forming a plurality of second shield tunnel regions extending at second intervals along a line-shaped second processing-planned region adjacent to the first processing-planned region on the one planar surface, by alternately forming second irradiate regions and second unirradiated regions of the laser beam, wherein each of the second shield tunnel region partly overlaps with adjacent two of the plurality of first shield tunnel regions and fully overlaps with a first unirradiated region between the adjacent two first shield tunnel regions when the workpiece is viewed in a direction that goes from the first processing-planned region to the second processing-planned region.

2. The manufacturing method of a plate-shaped object according to claim 1, wherein the workpiece is formed of glass.

3. The manufacturing method of a plate-shaped object according to claim 1, further comprising:

a filling step of filling, with resin, spaces formed in the first shield tunnel region and the second shield tunnel region after the etching step.

* * * * *